United States Patent
Fiedrich

(12) 
(10) Patent No.: US 6,270,016 B1
(45) Date of Patent: Aug. 7, 2001

(54) RADIANT FLOOR, WALL AND CEILING HYDRONIC COOLING SYSTEMS AND HEATING AND COOLING SYSTEMS, USING METAL PLATES THAT ARE HEATED OR COOLED BY ATTACHED TUBING THAT IS FED HOT OR COLD WATER, MODULAR PANELS HINGED TOGETHER IN A SET OF PANELS

(76) Inventor: Joachim Fiedrich, 20 Red Pine Dr., Carlisle, MA (US) 01741

( * ) Notice: Subject to any disclaimer, the term of this patent is extended or adjusted under 35 U.S.C. 154(b) by 0 days.

(21) Appl. No.: 09/307,540

(22) Filed: May 7, 1999

(51) Int. Cl.[7] ........................................................ F24D 5/10
(52) U.S. Cl. ................................................. 237/69; 165/56
(58) Field of Search ................................ 237/69; 165/56, 165/49, 171, 169

(56) References Cited

U.S. PATENT DOCUMENTS

| | | | |
|---|---|---|---|
| 5,078,203 | 1/1992 | Shiroki | 165/56 |
| 5,131,458 | 7/1992 | Bourne | 165/56 |
| 5,454,428 | 10/1995 | Pickard | 237/69 |
| 5,579,996 | 12/1996 | Fiedrich | 237/69 |
| 5,788,152 | 8/1998 | alsberg | 237/69 |

*Primary Examiner*—Harold Joyce
*Assistant Examiner*—Derek S. Boles
(74) *Attorney, Agent, or Firm*—Robert T Dunn, Esq.

(57) ABSTRACT

In a hydronic radiant heating and/or cooling system modular panels each of a metal plate or sheet on a board or boards providing a slot into which tubing is inserted and held against the plate in intimate thermal contact therewith, so that the plate is heated/cooled by conduction of heat between the water in the tubing and the plate, the improvement in which two or more of said panels are hinged together, side by side or end to end to provide a hinged set of panels so that two or more of sets of hinged panels unfolded at their hinges and arranged side by side on a floor, wall or ceiling provide elongated spaces into which said tubing is inserted and held against said radiation plate a finished floor, wall or ceiling covering can be installed thereon and said system operated to heat or cool said room.

20 Claims, 8 Drawing Sheets

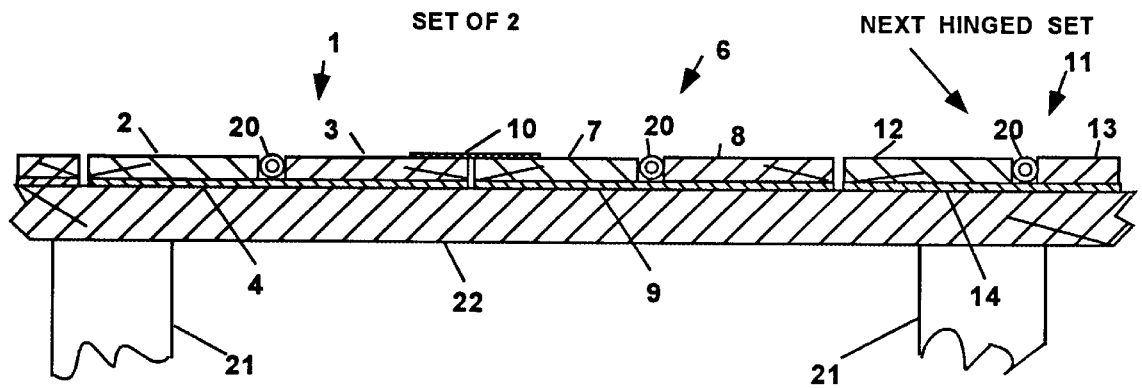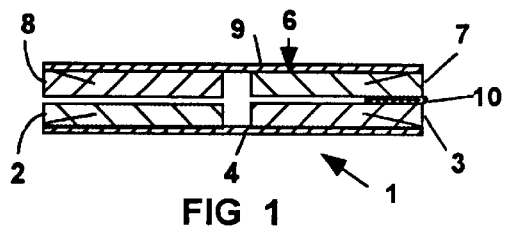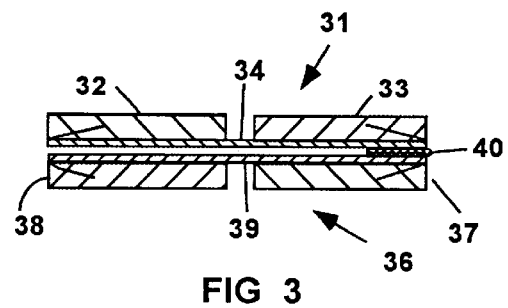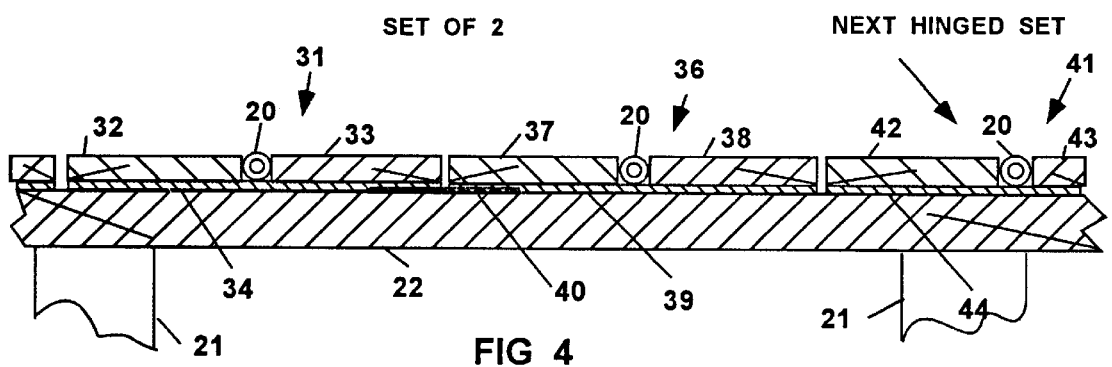

RADIANT FLOOR, WALL AND CEILING HYDRONIC COOLING SYSTEMS AND HEATING AND COOLING SYSTEMS, USING METAL PLATES THAT ARE HEATED OR COOLED BY ATTACHED TUBING THAT IS FED HOT OR COLD WATER, MODULAR PANELS HINGED TOGETHER IN A SET OF PANELS

BACKGROUND OF THE INVENTION

This invention relates to radiant hydronic systems using metal plates that are heated or cooled by attached tubing that is fed hot or cold water for heating and/or cooling dwellings, offices, etc., the metal plates being held in the floor, walls or ceiling of a room as part of an assembly of modular panels into which the tubing is inserted so that the plates radiate heat to the room when the tubing is fed hot water, to heat the room; or absorbs heat from the room by radiation when the tubing is fed cold water, to cool the room; the tubing being secured in the panels in intimate thermal contact with the radiation plate and covered by a finished floor, wall or ceiling of the room.

In particular, a set of two or more of such modular panels are connected together by hinges so that the set is unfolded for installation by attachment to a floor, wall or ceiling followed by insertion of the tubing for heating and/or cooling.

DRY NODULAR PANEL RADIANT HYDRONIC HEATING

Hydronic radiant floor heating (RFH), radiant wall heating (RWH) and radiant ceiling heating (RCH) are techniques of heating a room in a dwelling or commercial building for human and creature comfort. It is believed by many that hydronic radiant heating is the ideal way to warm the human body and superior to forced hot air heating.

Typical hydronic heating systems require a supply of hot water from a boiler and means for modulating the temperature of the water from the supply that is fed to the heating loops of the system, which include tubing and heating elements. This is particularly the case where modular panels are used in a dry installation in the floor for RFH, in the wall for RWH or in the ceiling for RCH. For example, if the supply water temperature is 180° F. for laundry, it must be modulated to about 100° F. (or lower) for RFH. A suitable system for reducing and controlling the supply water temperature for RFH, RWH and RCH is described in U.S. Pat. No. 5,119,988, issued Jun. 9, 1992, entitled "Hydronic Heating Water Temperature Control System, to Joachim Fiedrich, the inventor herein. In that patent a three-way, modulated diverting or by-pass valve is provided in the return line to the boiler, for diverting some of the cooler return water to the hot supply water to reduce the temperature of the supply water feeding the heating loop supply header. This is sometimes called temperature dilution and the diverting valve is modulated by a feedback signal derived from the diluted water temperature.

Modular panel heating elements for RFH, RWH and RCH are described in U.S. Pat. No. 5,292,065, issued Mar. 8, 1994, entitled "Radiant Floor And Wall Hydronic Heating Systems", to Joachim Fiedrich, the inventor herein. The panel elements include a metal radiation plate or sheet attached to two spaced apart boards for holding the tubing between the boards in intimate thermal contact with the radiation plate, so that the plate is heated by conduction of heat from the tubing, and the plate has a substantial radiating surface that radiates heat to the room.

Thermal conduction from the tubing to the plate and mechanical attachment of the tubing to the panel are insured by a resilient thermally conductive filler material as described in U.S. Pat. No. 5,579,996, issued Dec. 3, 1996, entitled "Radiant Floor And Wall Hydronic Heating Systems", also to Joachim Fiedrich, the inventor herein.

A mechanical adaptation that increases further the thermal path from the tubing to the plate consists of an undercut in each of the holding boards immediately adjacent the plate and the space for holding the tubing, that is filled with the thermally conductive filler material, providing a greater "thermal footprint" for the tubing on the plate. This mechanical adaptation is described in currently pending U.S. patent application Ser. No. 08/500,069, filed Jul. 10, 1995, entitled Radiant Floor And Wall Hydronic Heating System Tubing Attachment To Radiant Plate, also by Joachim Fiedrich, the inventor herein.

Hydronic heating systems using the modular panel heating elements described in the aforementioned U.S. Pat. Nos. 5,292,065 and 5,579,996 and in the aforementioned pending U.S. application Ser. No. 08/500,069 to cool as well as heat are described in U.S. Provisional Application Ser. No. 60/048,682, filed Jun. 5, 1997, entitled "Hydronic Heating And/Or Cooling Systems Using Metal Radiation Plates That Are Heated Or Cooled By Attached Tubing Fed Hot Or Cold Water" by Joachim Fiedrich, the inventor herein. The systems described in that pending application include floor, wall and ceiling installations of modular panel elements and tubing. The floor installations are particularly effective for heating and can also be used for cooling; the ceiling installations are particularly effective for cooling and can also be used for heating; and the wall installations are effective for both heating and cooling.

Cooling is done by feeding cool water to the tubing to reduce the temperature of the radiation plate in the modular panel, to below room temperature so that heat is radiated from the room to the plate and conducted from the plate to the cool water in the tubing, heating the water slightly and the water is fed to a heat exchanger where it gives up the heat and is fed back to the panels. This circulation of cool water is continuous and may be a closed system. Systems for heating, systems for cooling and systems for doing both are described in that application.

In any of the systems described in the aforementioned U.S. Provisional Application Ser. No. 60/048,682, hot and/or cold spots on the surface of the finished floor, wall or ceiling that covers the modular panels sometimes occurs. These spots are identified as being hotter during heating or cooler during cooling than elsewhere on the finished surface, whereas uniform surface temperature is preferred. Cold spots on the finished covering during cooling can be particularly troublesome, because when the temperature of the cold spot falls below the dew point in the room, undesirable condensation occurs on the surface. These problems are addressed in U.S. patent application Ser. No. 08/862,441, filed May 23, 1997, entitled "For Radiant Floor, Wall and Ceiling Heating and/or Cooling Systems Using Metal Plates That are Heated or Cooled by Attached Tubing that is Fed Hot or Cold Water, Techniques of Improving Performance and Avoiding Condensation When Cooling", by Joachim Fiedrich, the inventor herein.

In such a modular panel, attachment of the metal radiation plate or sheet to the boards is done effectively by staking using a unique staking tool as described in U.S. Provisional Application Ser. No. 08/746,458, filed Nov. 12, 1996, entitled "Apparatus And Method of Attaching Radiating Plate to Holders of Modular Unit For Radiant Floor And Wall Hydronic Heating Systems", by Joachim Fiedrich, the inventor herein.

Other modular panel structures for a "dry" installation in which each modular panel is a single metal clad board and the panels are installed spaced apart, with or without additional metal parts in between, can provide some advantages including: simplicity of parts, ease of installation, performance of installation and costs. These are described in U.S. Provisional Application Ser. No. 09/092,110, filed Jun. 5, 1998, entitled "In Radiant Floor, Wall and Ceiling Hydronic Cooling Systems and Heating and Cooling Systems, Using Metal Plates That Are Heated or Cooled by Attached Tubing That Is Fed Hot or Cold Water, Structures of Plates And Tubing Attachments", by Joachim Fiedrich, the inventor herein.

SUMMARY OF THE INVENTION

It is an object of the present invention to provide a method and means of providing a modular panels for "dry" installation in a set of two or more panels for ease of installation and accuracy of installation.

According to embodiments of the present invention, two or more modular radiation panels that each contain all or part of the radiation plate, as in the prior art, are hinged together, side by side or end to end, so that the set is installed by unfolding and attaching to the floor, wall or ceiling. The panels in a set are the same and when unfolded and laid flat the panels in the set are properly aligned, by virtue of their hinge connections.

In all embodiments, the tubing is inserted after the panels in the set are unfolded and laid flat on the floor, wall or ceiling and can serve for heating or for cooling the room. The set of panels can be arranged in line with another set attached to the sub-flooring for RFH/RFC, the wall studs for RWH/RWC and the ceiling rafters, joists or strapping for RCH/RCC. Then the tubing is inserted into the aligned holding spaces or grooves of the panels and may be secured therein by thermally conductive resilient filler material. Following that, the finished floor, wall or ceiling covering is installed over the panels.

Thus, RFH/RFC and RWH/RWC and RCC/RCH are installed "dry" (without wet concrete, cement or plaster embedding the tubing) and can be accessed later by simply removing the finished floor, wall or ceiling covering.

As described in the above mentioned U.S. Pat. No. 5,292,065 panels of the First Type consist of two spaced apart boards and a flat metal plate attached to the boards and the tubing is inserted into the space between the boards against the plate. It is preferred that a resilient thermally conductive filler material be inserted in the space before the tubing is inserted, as described in the above mentioned U.S. Pat. No. 5,579,996 and that spaced apart edges of the boards be undercut as described in the above mentioned U.S. patent application Ser. No. 08/500,069 and the radiation plate or sheet be attached to the boards by staking as described in the above mentioned U.S. patent application Ser. No. 08/746,458.

As also described in the above mentioned U.S. Pat. No. 5,292,065, panels of the Second Type consist of two spaced apart boards and a flat metal plate having a longitudinal groove the length of the plate is attached to the boards with the groove projecting into the space between the boards and the tubing is inserted into the groove in the plate between the boards. Thus, the tubing is in direct contact with the metal plate in the groove over most of the outer periphery of the tubing. Inserting thermally conductive filler material into the groove before the tubing is inserted is optional. However, the grooved radiation plate or sheet is preferably attached to the boards by staking as described in the above mentioned U.S. patent application Ser. No. 08/746,458.

BRIEF DESCRIPTION OF THE DRAWINGS

FIGS. 1 and 2 are cross-section views showing two of the First Type panels connected side by side by a flap hinge that is attached to the top of adjacent boards of the panels, FIG. 1 showing the two panels folded at the hinge for stacking with similarly folded sets of hinged panels; and FIG. 2 showing the two panels unfolded and laid on a sub-floor alongside similar panels;

FIGS. 3 and 4 are cross-section views showing two of the First Type panels connected side by side by a flap hinge that is attached to the bottom of adjacent boards of the panels on the plates thereof, FIG. 3 showing the two panels folded at the hinge for stacking with similarly folded sets of hinged panels; and FIG. 4 showing the two panels unfolded and laid on a sub-floor alongside similar panels;

FIG. 6 showing the three panels unfolded and laid on a sub-floor alongside similar panels;

FIG. 10 showing the two panels unfolded and laid on a sub-floor alongside similar panels;

FIG. 12 showing the two panels unfolded and laid on a sub-floor alongside similar panels, ready for insertion of the tubing 20 in the slots in the plates;

FIG. 14 showing the two panels unfolded and laid on a sub-floor alongside similar panels, ready for insertion of the tubing 20 in the slots in the plates;

FIG. 14 showing the two panels unfolded and laid on a sub-floor alongside similar panels, the contoured edges fitting together and ready for insertion of the tubing 20 in the slots in the plates;

FIG. 18 showing the end view of the two panels folded at the hinge; and FIG. 19 showing the two panels unfolded and laid on a sub-floor end to end with similar panels;

FIG. 21 showing the end view of the two panels folded at the hinge; and FIG. 22 showing the two panels unfolded and laid on a sub-floor end to end with similar panels;

DESCRIPTION OF EMBODIMENTS OF THE INVENTION

Figure 6:
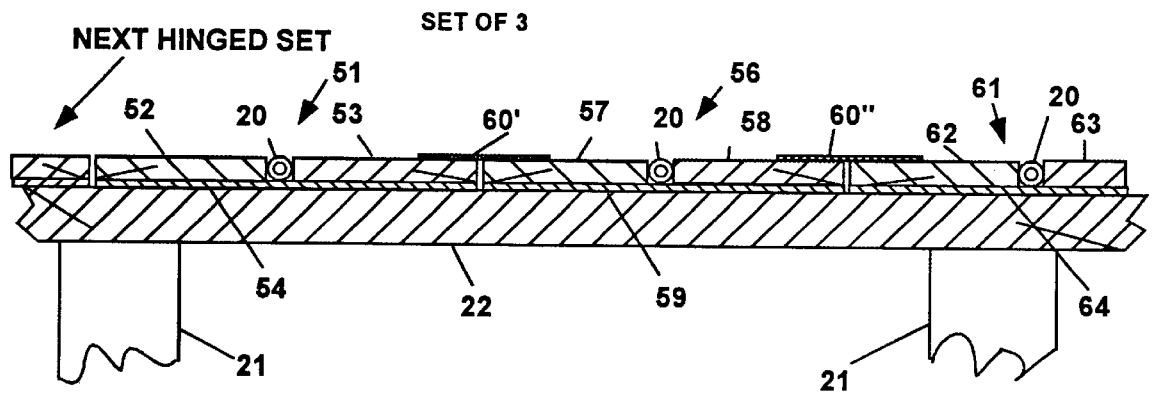
FIGS. 5 and 6 are cross-section views showing three of the First Type panels connected side by side by flap hinges that are attached to the top of adjacent boards of the panels, FIG. 5 showing two of the panels folded as in FIG. 1 and the third panel folded at a right angle thereto, in a way that is suitable for nesting if not for stacking.

Two—First Type—Panels Side By Side Flap Hinge On Boards

FIGS. 1 and 2 show an embodiment of two modular panels 1 and 6 of the First Type, folded in FIG. 1 at an attached flap hinge 10 on adjacent holder boards 3 and 7 of panels 1 and 6, respectively, the flap partially covering the boards.

As mentioned above, panels of the First Type consist of two spaced apart boards and a flat metal plate attached to the boards and the tubing is inserted into the space between the boards against the plate and it is preferred that a resilient thermally conductive filler material be inserted in the space before the tubing is inserted and that spaced apart edges of the boards be undercut and the radiation plate or sheet be attached to the boards by staking. Panels of the First Type can be installed on top of the sub-floor or under the sub-floor between the floor joists or on wall studs or on ceiling rafters and in all cases there is ready access to the space between the boards into which the tubing is inserted.

As shown in FIG. 1, the hinged panels 1 and 6 (of the First Type) are connected by a flange hinge 10 that is attached to the top face of the adjacent boards 3 and 7 of the panels. The flap may be a strip of flexible plastic or fabric or a suitable strong adhering tape. The thickness of the flap is preferably negligible (less than $1/16$") so that when the panels 1 and 6 are unfolded as shown and laid on a sub-floor 22 supported by floor joists 21, as shown in FIG. 2, there is no requirement to add compensating layers of material to the top of other parts of the panel boards so that the top of them is even across the floor.

Panel 1 consists of evenly spaced apart boards 2 and 3 and metal radiation plate or sheet 4 attached thereto by, for example staking, Similarly panel 6 consists of evenly spaced apart boards 7 and 8 and metal radiation plate or sheet 9 attached thereto by staking. Flap type hinge 10 that may be a strip of flexible plastic or fabric or a suitable strong adhering tape is attached to the top of adjacent boards 3 and 7 so that the hinged panels 1 and 6 may fold as shown in FIG. 1 or unfold and laid on the db-floor as shown in FIG. 2 alongside other hinged sets of panels such as 11 that consists of boards 12 and 13 and attached plate 14.

Two—First Type—Panels Side By Side Flap Hinge On Plate

FIGS. 3 and 4 show another embodiment in cross-section of two modular panels of the First Type, folded at an attached flap type hinge on the radiation plate of each panel, the flap partially covering the plate where the plate is full to the outer edges of the boards.

As shown in FIG. 3, the hinged panels 31 and 36 (of the First Type) are connected by a flange hinge 40 that is attached to the bottom of the panels on the edges of the adjacent radiation plates 34 and 39. The flap may be a strip of flexible plastic or fabric or a suitable strong adhering tape of negligible thickness so that when the panels 31 and 36 are unfolded as shown and laid on a sub-floor 22 supported by floor joists 21, as shown in FIG. 4, there is no requirement to add compensating layers of material to the sub-floor so that the top thereof is even across the floor.

Panel 31 consists of evenly spaced apart boards 32 and 33 and metal radiation plate or sheet 34 attached thereto by, for example staking. Similarly, panel 36 consists of evenly spaced apart boards 37 and 38 and metal radiation plate or sheet 39 attached thereto by staking. Flap type hinge 40 that may be a strip of flexible plastic or fabric or a suitable strong adhering tape is attached to the bottom of the adjacent panels so that the hinged may fold as shown in FIG. 3 or unfold and laid on the sub-floor as shown in FIG. 4 alongside other hinged sets of panels such as 41 that consists of boards 42 and 43 and attached plate 44.

Three—First Type—Panels Side By Side Flap Hinges On Boards Only

Figure 5:
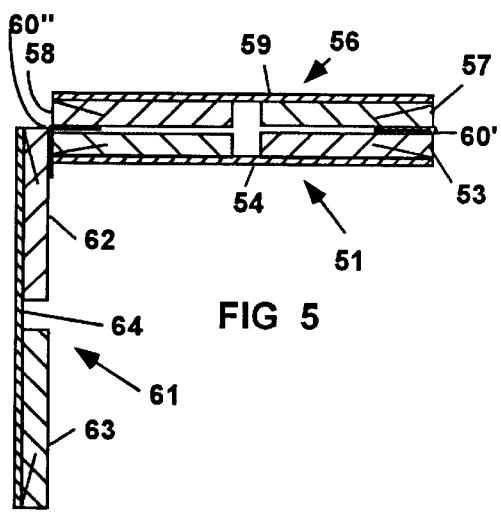

FIG. 5 shows the another embodiment in cross-section of three modular panels 51, 56 and 61 of the First Type, folded at an attached flap hinge on top of adjacent holder boards of each panel, the flap partially covering the boards.

As shown in FIG. 5, the hinged panels 51, 56 and 61 (of the First Type) are connected by flange hinges 60' and 60" that are both attached to the top of the panels on the edges of the adjacent boards of the three panels. The flap may be a strip of flexible plastic or fabric or a suitable strong adhering tape of negligible thickness so that when the panels 51. 56 and 61 are unfolded as shown and laid on a sub-floor 22 supported by floor joists 21, as shown in FIG. 6, there is no requirement to add compensating layers of material to the top of other parts of the panel boards so that the top of them is even across the floor.

Panel 51 consists of evenly spaced apart boards 52 and 53 and metal radiation plate or sheet 54 attached thereto by, for example, staking, Similarly: panel 56 consists of evenly spaced apart boards 57 and 58 and metal radiation plate or sheet 59 attached thereto by staking; and panel 61 consists of evenly spaced apart boards 62 and 63 and metal radiation plate or sheet 64 attached thereto by staking. Flap type hinges 60' and 60" may be strips of flexible plastic or fabric or a suitable strong adhering tape is attached to the top of the adjacent panels so that the hinges may fold as shown in FIG. 5 or unfold and laid on the sub-floor as shown in FIG. 6 alongside other hinged sets of panels.

While the folded panels shown in FIG. 5 may not be suitable for stacking set upon set, it is suitable for nesting.

Figure 8:
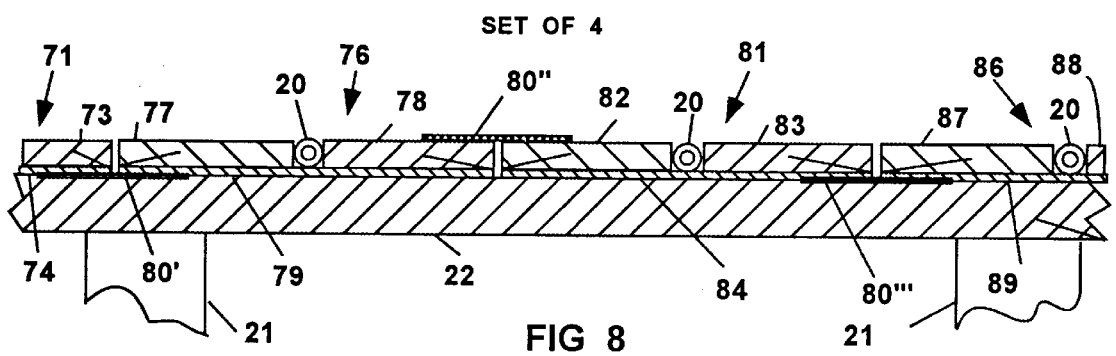

Four—First Type—Panels Side By Side Flap Hinges Alternately On Boards And Plates FIG. 8 shows another embodiment in cross-section of four modular panels 71, 76, 81 and 86 of the First Type, folded at attached flap hinges, that are attached alternately to the radiation plates and the boards of the four panels, the flaps fully covering the plates and/or boards.

Figure 7:
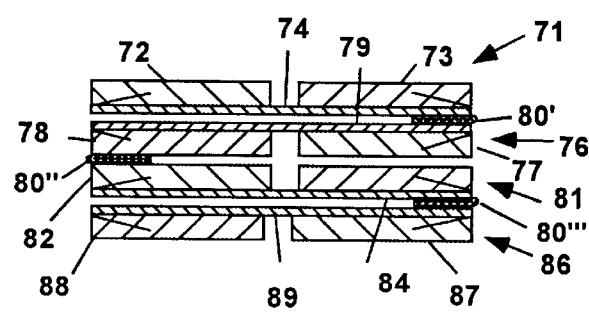
FIGS. 7 and 8 are cross-section views showing four of the First Type panels connected side by side by flap hinges that are attached to the top of adjacent boards of the panels and to the bottom of adjacent boards of the panels on the plates thereof, alternately, FIG. 7 showing the four panels folded at the hinges and in an orderly stack for stacking with similarly folded sets of hinged panels, and FIG. 8 showing the four panels unfolded and laid on a sub-floor alongside similar panels.

As shown in FIG. 7, the hinged panels 71, 76, 81 and 86 (all of the First Type) are connected by flap hinges 80', 80" and 80''' that are attached alternately to the bottom and the top of the panels of the adjacent plates and boards of the four panels. The flaps may be strips of flexible plastic or fabric or a suitable strong adhering tape of negligible thickness so that when the panels 71, 76, 81 and 86 are unfolded and laid on a sub-floor 22 supported by floor joists 21, as shown in FIG. 8, there is no requirement to add compensating layers of material to the top or the bottom of other parts of the panels so that the top of them and the sub-floor is even across the floor.

Panel 71 consists of evenly spaced apart boards 72 and 73 and metal radiation plate or sheet 74 attached thereto by, for example, staking, Similarly: panel 76 consists of evenly spaced apart boards 77 and 78 and metal radiation plate or sheet 79 attached thereto by staking; panel 81 consists of evenly spaced apart boards 82 and 83 and metal radiation plate or sheet 84 attached thereto by staking; and panel 86 consists of evenly spaced apart boards 87 and 88 and metal radiation plate or sheet 89 attached thereto by staking. Flap type hinges 80', 80" and 80''' may be strips of flexible plastic or fabric or a suitable strong adhering tape is attached to the top or bottom of the adjacent panels so that the hinges may fold as shown in FIG. 7 or unfold and laid on the sub-floor as shown in FIG. 8 alongside other hinged sets of panels.

The folded panels of such a set, shown in FIG. 7, is suitable for stacking set upon set.

Two—First Type—Panels Side By Side Pin Hinge On Boards

Figure 10:
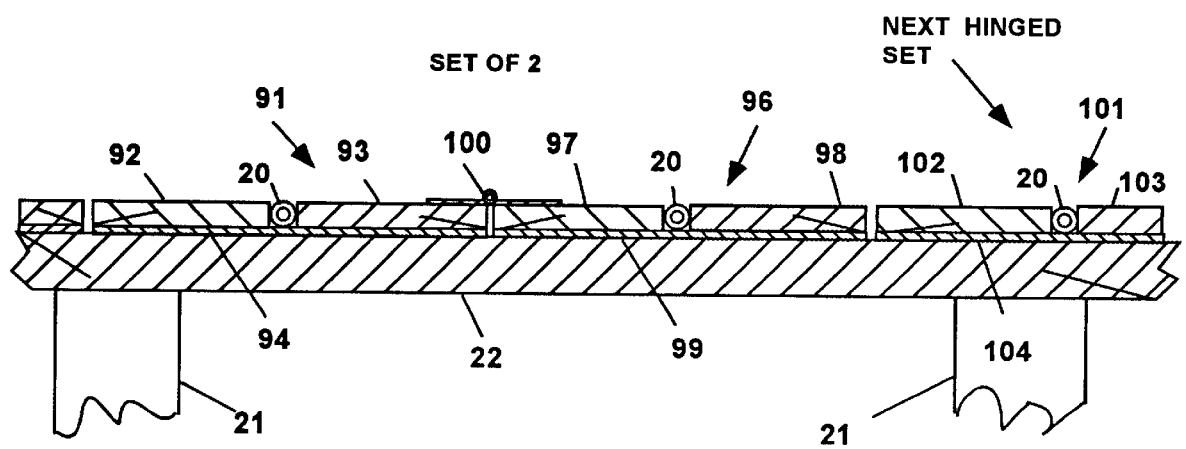
FIGS. 9 and 10 are cross-section views showing two of the First Type panels connected side by side by a piano hinge that is attached to the top of adjacent boards of the panels, FIG. 9 showing the two panels folded at the hinge for stacking with similarly folded sets of hinged panels.
Figure 9:
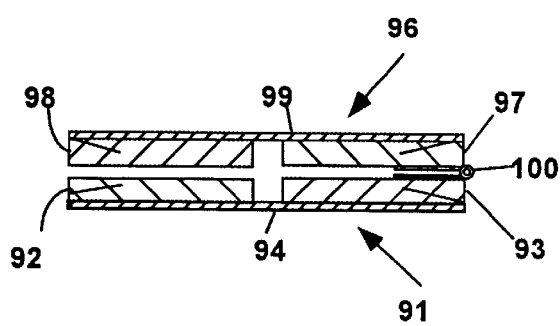

FIGS. 9 and 10 show show another embodiment in cross-section of two modular panels of the First Type, folded at an attached pin hinge (piano hinge) on top of the adjacent boards of the set.

As shown in FIG. 9, the hinged panels 91 and 96 (both of the First Type) are connected by a pin hinge (piano hinge) 100 that is attached to the top of the adjacent boards 93 and 97 of the panels. The pin hinge is longitudinally rigid and preferably made of metal and is attached to the boards by staking, screwing or adhesive. The thickness of the hinge may or may not be negligible. If not negligible, then when the panels 91 and 96 are unfolded as shown and laid on a sub-floor 22 supported by floor joists 21, as shown in FIG. 10, there may be the requirement to add compensating layers of material to the top of other parts of the panel boards so that the top is even across the floor.

Panel 91 consists of evenly spaced apart boards 92 and 93 and metal radiation plate or sheet 94 attached thereto by, for example staking, Similarly panel 96 consists of evenly spaced apart boards 97 and 98 and metal radiation plate or sheet 99 attached thereto by staking. Pin hinge 100 is attached to the top of adjacent boards 93 and 97 so that the hinged panels 91 and 96 may fold as shown in FIG. 9 or unfold and laid on the sub-floor as shown in FIG. 10 alongside other hinged sets of panels such as 101 that consists of boards 102 and 103 and attached plate 104.

Figure 12:
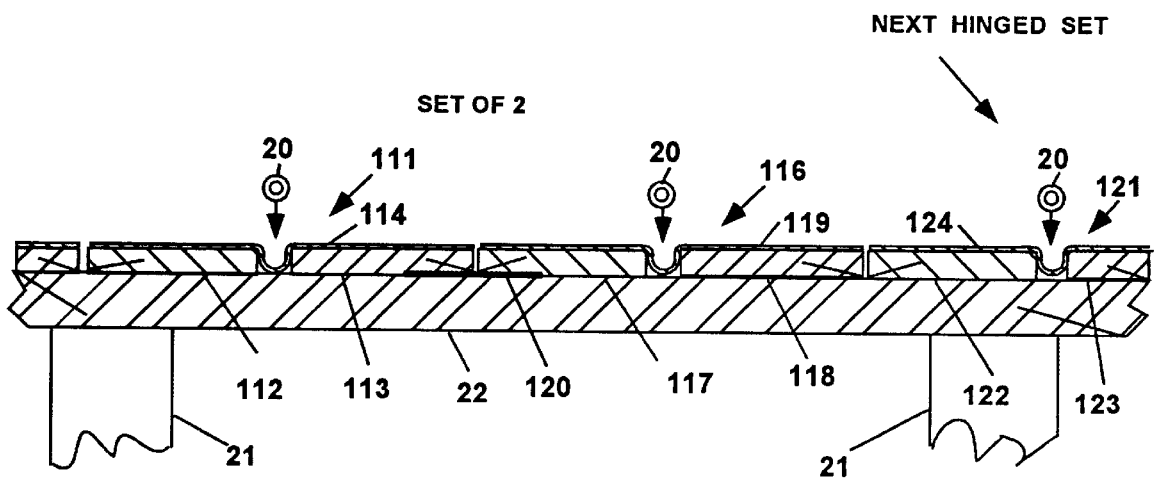
FIGS. 11 and 12 are cross-section views showing two of the Second Type panels connected side by side by a flap hinge that is attached to the bottom of adjacent boards of the panels on the boards thereof, FIG. 11 showing the two panels folded at the hinge for stacking with similarly folded sets of hinged panels.
Figure 11:
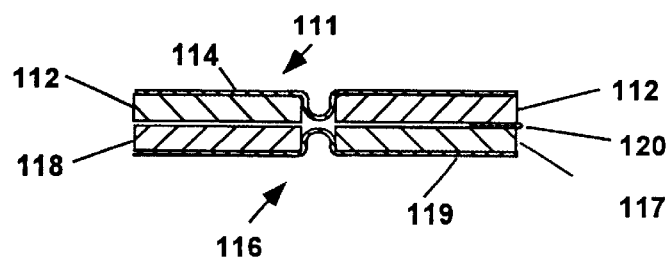

Two—Second Type—Panels Side By Side Flap Hinge On Bottom Edges Of The Boards FIGS. 11 and 12 show the another embodiment herein in cross-section of two modular panels 111 and 116 of the Second Type, folded at an attached flap hinge 120 on the bottom edges of the adjacent holder boards 113 and 117 of each panel.

As mentioned above panels of the Second Type consist of two spaced apart boards and a flat metal plate having a longitudinal groove the length of the plate is attached to the boards with the groove projecting into the space between the boards and the tubing is inserted into the groove in the plate between the boards. Thus, the tubing is in direct contact with the metal plate in the groove over most of the outer periphery of the tubing. Inserting thermally conductive filler material into the groove before the tubing is inserted is optional. However, the grooved radiation plate or sheet is preferably attached to the boards by staking as described in the above mentioned U.S. patent application Ser. No. 08/746,458.

As shown in FIG. 11, the hinged panels 111 and 116 (of the Second Type) are connected by a flange hinge 120 that is attached to the edges of the bottom face of the adjacent boards 113 and 117 of the panels. The flap may be a strip of flexible plastic or fabric or a suitable strong adhering tape. The thickness of the flap is preferably negligible (less than $1/16$") so that when the panels are unfolded as shown and laid on a sub-floor 22 supported by floor joists 21, as shown in FIG. 12, there is no requirement to add compensating layers of material between the panels and the sub-floor.

Panel 111 consists of evenly spaced apart boards 112 and 113 and metal radiation plate or sheet 114 attached thereto by, for example staking, Similarly panel 116 consists of evenly spaced apart boards 117 and 118 and metal radiation plate or sheet 119 attached thereto by staking. Flap type hinge 100 that may be a strip of flexible plastic or fabric or a suitable strong adhering tape is attached to the bottom of adjacent boards 113 and 117 so that the hinged panels 111 and 116 may fold as shown in FIG. 11 or unfold and laid on the sub-floor as shown in FIG. 12 alongside other hinged sets of panels such as 121 that consists of boards 122 and 123 and attached plate 124.

Figure 14:
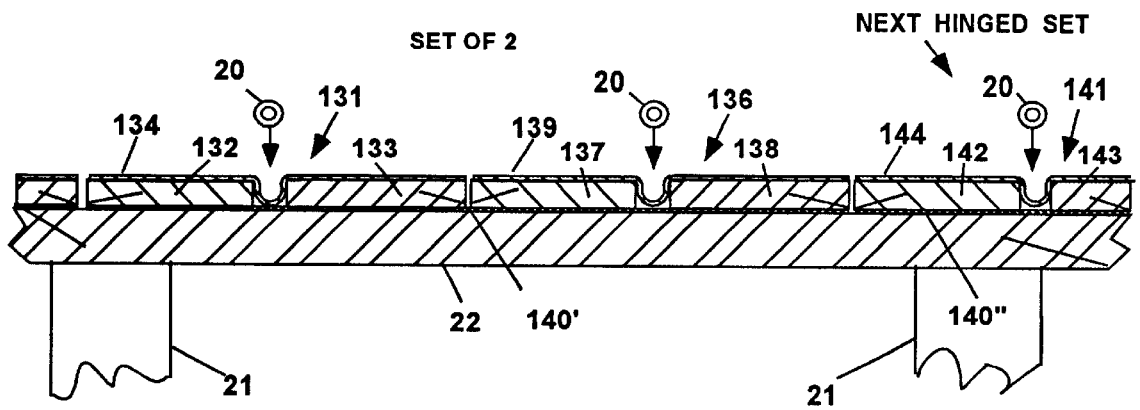
FIGS. 13 and 14 are cross-section views showing two of the Second Type panels connected side by side by a flap hinge that is attached to the bottom of adjacent panels, fully covering the whole bottom of both panels on the boards thereof, FIG. 13 showing the two panels folded at the hinge for stacking with similarly folded sets of hinged panels.
Figure 13:
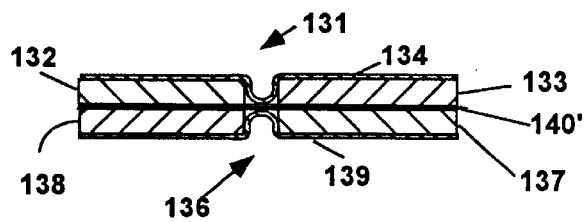

Two—Second Type—Panels Side By Side Flap Hinge Fully Covering Bottom Of Boards FIGS. 13 and 14 show another embodiment herein in cross-section of two modular panels 131 and 136 of the Second Type, folded at an attached flap hinge 140' on the bottom of the panels, fully covering the boards on the bottom of each panel.

As shown in FIG. 13, the hinged panels 131 and 136 (both of the Second Type) are connected by a flange hinge 140' that is attached to the bottom of the panels and fully covers the entire bottom of both boards of each panel. The flap may be a strip of flexible plastic or fabric or a suitable strong adhering tape. The thickness of the flap need not be negligible, because it covers the entire bottom of both panels. In this case, the flap material may be thermally insulating and/or sound insulation as well as a hinge that allows folding the two panels as shown in FIG. 13 and unfolding as shown and laid on a sub-floor 22 supported by floor joists 21, as shown in FIG. 14.

Panel 131 consists of evenly spaced apart boards 132 and 133 and metal radiation plate or sheet 134 attached thereto by, for example staking, Similarly panel 136 consists of evenly spaced apart boards 137 and 138 and metal radiation plate or sheet 139 attached thereto by staking. Flap type hinge layer 140 may be thermally insulating and/or sound insulation as well as a hinge that allows folding the two panels to fold as shown in Figure and unfold and laid on the sub-floor as shown in FIG. 14 alongside other hinged sets of panels such as 141 that consists of boards 142 and 143 and attached plate 144.

Figure 15:
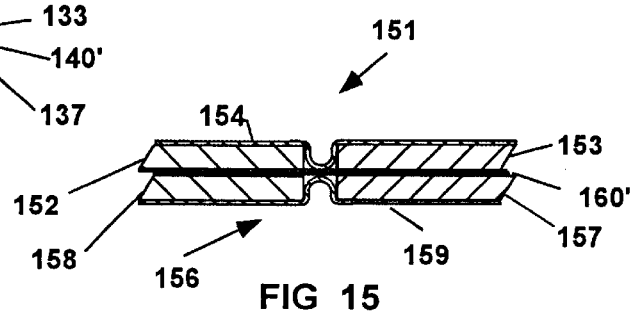
FIGS. 15 and 16 are cross-section views showing two of the Second Type panels having contoured matching edges, connected side by side by a flap hinge that is attached to the bottom of adjacent panels, fully covering the whole bottom of both panels on the boards thereof, FIG. 13 showing the two panels folded at the hinge for stacking with similarly folded sets of hinged panels.
Figure 16:
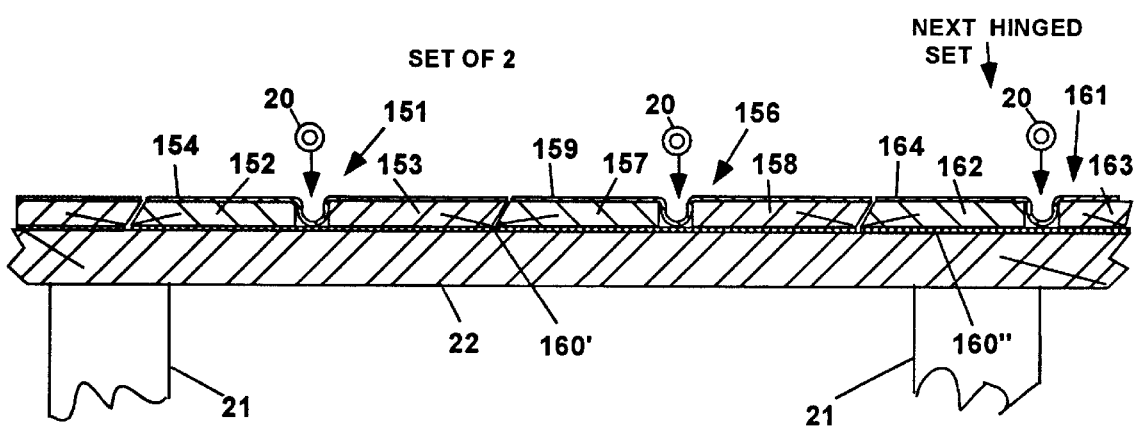

Two—Second Type—Panels Side By Side Flap Hinge Fully Covering Bottom Of Boards Having Contoured Edges Between Panels FIGS. 15 and 16 show another embodiment herein in cross-section of two modular panels 151 and 156 of the Second Type, folded at an attached flap hinge 160' on the bottom of the panels, fully covering the boards on the bottom of each panel. Both edges of each panel are contoured with matching contours. In this example, the matching contours are simple bevels and serve to provide an overlap of the panels in a set when they are unfolded. The outside edges of each panel are also contoured so that each set edge overlaps the set it is adjacent to.

As shown in FIG. 15, the hinged panels 151 and 156 are connected by a flange hinge 160' that is attached to the bottom of the panels and fully covers the entire bottom of both boards of each panel. The flap may be a strip of flexible plastic or fabric or a suitable strong adhering tape. The thickness of the flap need not be negligible, because it covers the entire bottom of both panels. In this case, the flap material may be thermally insulating and/or sound insulation as well as a hinge that allows folding the two panels as shown in FIG. 15 and unfolding as shown and laid on a sub-floor 22 supported by floor joists 21, as shown in FIG. 16.

Panel 151 consists of evenly spaced apart boards 152 and 153 and metal radiation plate or sheet 154 attached thereto by, for example staking, Similarly panel 156 consists of evenly spaced apart boards 157 and 158 and metal radiation plate or sheet 159 attached thereto by staking. Flap type hinge layer 160' may be thermally insulating and/or sound insulation as well as a hinge that allows folding the two panels to fold as shown in FIG. 15 and unfold and laid on the sub-floor as shown in FIG. 16 alongside other hinged sets of panels such as 161 that consists of boards 162 and 63 and attached plate 164.

As mentioned above, the outside edges of all boards are contoured with matching contours. In this example, the matching contours are simple bevels and serve to provide an overlap of the, panels in a set when they are unfolded. The outside edges of each panel are also contoured so that each set edge overlaps the set it is adjacent to.

The contour could also be matching steps. For example, the outside edges of all panel boards could be stepped to fit together when unfolded and to fit side by side with an adjacent set at installation on the sub-floor.

Two—First Type—Panels End To End Flap Hinge On Top Of Boards

Figure 19:
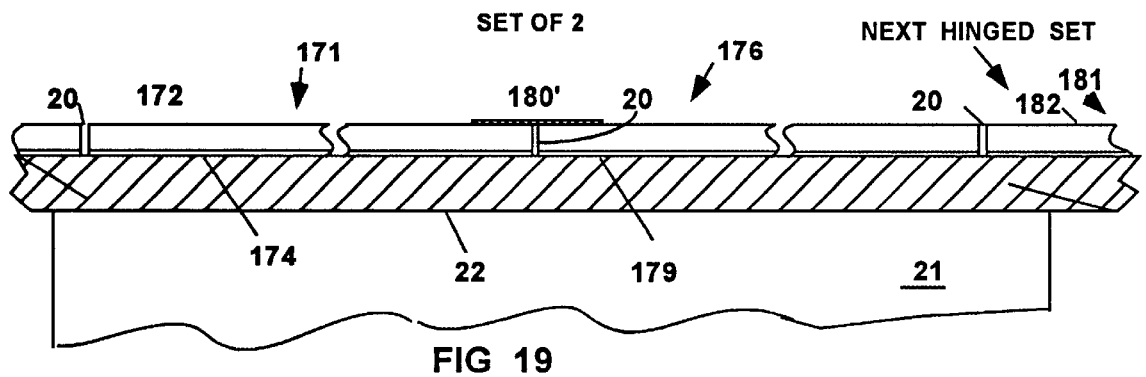
FIGS. 17, 18 and 19 are edge and end views showing two of the First Type panels connected end to end by flap hinges that attache to the top of adjacent boards of the panels, FIG. 17 showing the side view of the two panels folded at the hinge for stacking with similarly folded sets of hinged panels.
Figure 17:
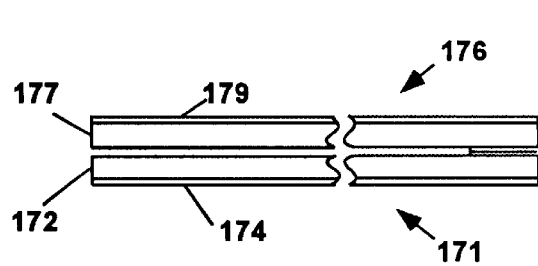
Figure 18:
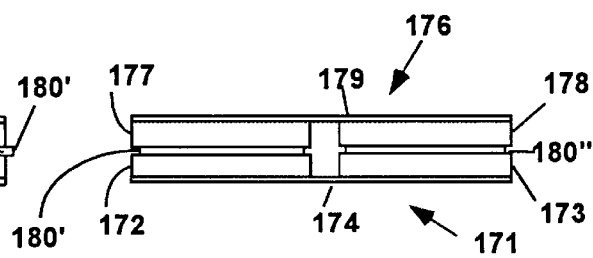

FIGS. 17, 18 and 19 show an embodiment of two modular panels 171 and 176 of the First Type, folded end to end in side and end edge views of FIGS. 17 and 18 at an attached two part flap hinge 180' and 180" on top of adjacent holder boards of each panel.

As shown in FIGS. 17 and 18, the hinged panels 171 and 176 (of the First Type) are connected by flange hinges 180' and 180" that are attached to the top at the ends of the adjacent boards 172 and 177 and 173 and 178 of the panels 171 and 176, respectively. The flaps may be a strip of flexible plastic or fabric or a suitable strong adhering tape, the thickness of the flap is preferably negligible (less than $\frac{1}{16}$") so that when the panels 171 and 176 are unfolded as shown and laid on a sub-floor 22 supported by floor joists 21, as shown in FIG. 19 and so there is no requirement to add compensating layers of material to the top of other parts of the panel boards so that the top is even across the floor.

Panel 171 consists of evenly spaced apart boards 172 and 173 and metal radiation plate or sheet 174 attached thereto by, for example staking, Similarly panel 176 consists of evenly spaced apart boards 177 and 178 and metal radiation plate or sheet 179 attached thereto by staking. Flap type hinges 180' and 180" may be a strips of flexible plastic or fabric or a suitable strong adhering tape is attached to the top end of adjacent boards of the end to end hinged panels 171 and 176 so that the hinged panels may fold as shown in FIGS. 17 and 18 or unfold and laid on the sub-floor as shown in FIG. 19 alongside other hinged sets of panels such as 181 that consists of boards 182 and 183 and attached plate 184.

Two—First Type—Panels End To End Flap Hinge On Bottom Of Plates

Figure 22:
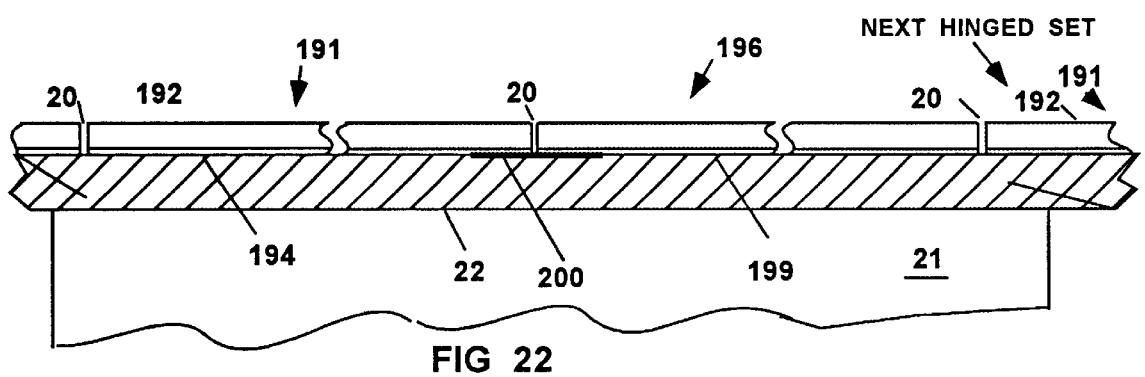
FIGS. 20, 21 and 22 are edge and end views showing two of the First Type panels connected end to end by flap hinges that attache to the bottom of adjacent boards on the plates of the panels, FIG. 20 showing the side view of the two panels folded at the hinge for stacking with similarly folded sets of hinged panels.
Figure 20:
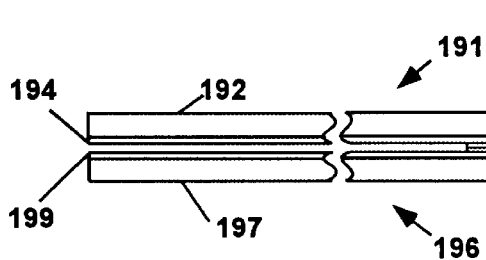
Figure 21:
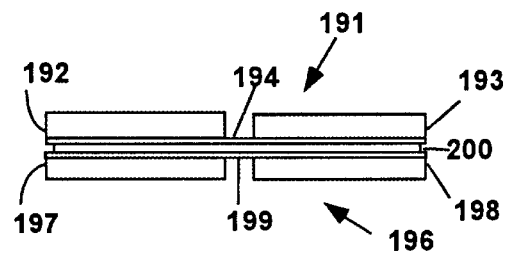

FIGS. 20, 21 and 22 show an embodiment of two modular panels 191 and 196 of the First Type, folded end to end in FIGS. 20 and 21 at an attached flap hinge 200 on the bottom of adjacent panels on the plates of the panels.

As shown in side and end edge views of FIGS. 20 and 21, the hinged panels 191 and 196 (both of the First Type) are connected by flange hinge 200 that is attached to the bottom at the ends of the adjacent plates 194 and 199 of the panels 191 and 196, respectively. The flap may be a strip of flexible plastic or fabric or a suitable strong adhering tape, the thickness of the flap is preferably negligible (less than $\frac{1}{16}$") so that when the panels 191 and 196 are unfolded as shown and laid on a sub-floor 22 supported by floor joists 21, as shown in FIG. 22 and so there is no requirement to add compensating layers of material between the panels and the sub-floor so that the panels are even across the sub-floor.

Panel 191 consists of evenly spaced apart boards 192 and 193 and metal radiation plate or sheet 194 attached thereto by, for example staking, Similarly panel 196 consists of evenly spaced apart boards 197 and 198 and metal radiation plate or sheet 199 attached thereto by staking. Flap type hinge 200 may be a strip of flexible plastic or fabric or a suitable strong adhering tape is attached to the bottom ends (against the plates) of adjacent boards of the end to end hinged panels 191 and 196 so that the hinged panels may fold as shown in FIGS. 20 and 21 or unfold and laid on the sub-floor as shown in FIG. 22 alongside other hinged sets of panels such as 201 that consists of boards 202 and 203 and attached plate 204.

Floor Installation—Panels Of—First Type—And Tubing On Top Of The Sub-Floor

Figure 23:
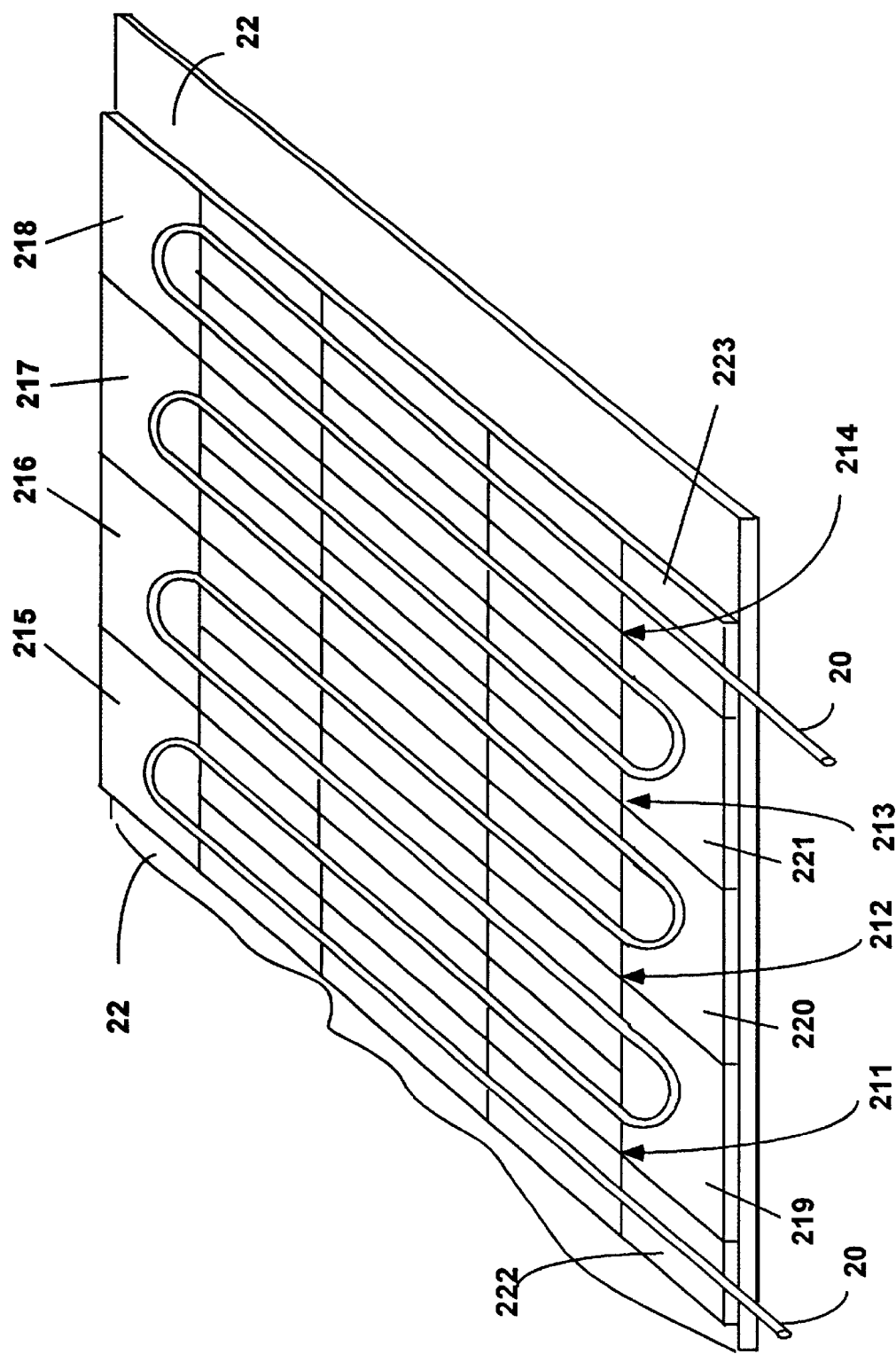
FIG. 23 is a perspective view of the RFH/RFC installation shown in FIG. 4 showing several courses of sets of two hinged panels of the First Type, some like in FIG. 2 for straight runs of tubing and some also of the First Type for 180 degree turns of the tubing, arranged side by side and end to end on top of the sub-floor with the tubing 20 installed and ready for installation of the finished floor covering.

A typical wood frame construction sub-floor is shown in FIG. 23. It includes a sub-floor 22 of plywood, particle board or one inch boards on floor joists. The installation of the unfolded side by side hinged sets of modular panels of the First Type and additional kinds (U turn modular panels), also of the First Type, and tubing 20 is all on top of the sub-floor. It includes four courses of the straight run modular panels of the First Type that are each side by side hinged sets of two, like the set of panels 1 and 6 shown in FIGS. 1 and 2, each course being three panels long. The four courses are denoted are 211 to 214 and the seven U turn modular panels 216 through 222 are arranged side by side and end to end across the floor, with straight panel sections 222 and 223 providing the tubing entry and exit to the courses, all together providing for eight passes of the tubing 20 inserted into the accommodating tube holding spaces of the panels and ready for covering by a finished floor covering.

The modular panels in this installation hold tubing 20 as a continuous length laid down serpentine fashion from panel to panel, embedded in the holding spaces of the straight and U turn modular panels and held securely therein by the space structure itself and the filler material therein. In this view of the floor installation, since panels of the First Type are used throughout, the radiating plates do not show as they are on the bottom face of the panels

Wall Installation—Panels Of—Second Type—And Tubing Horizontal Across Studs

Figure 24:
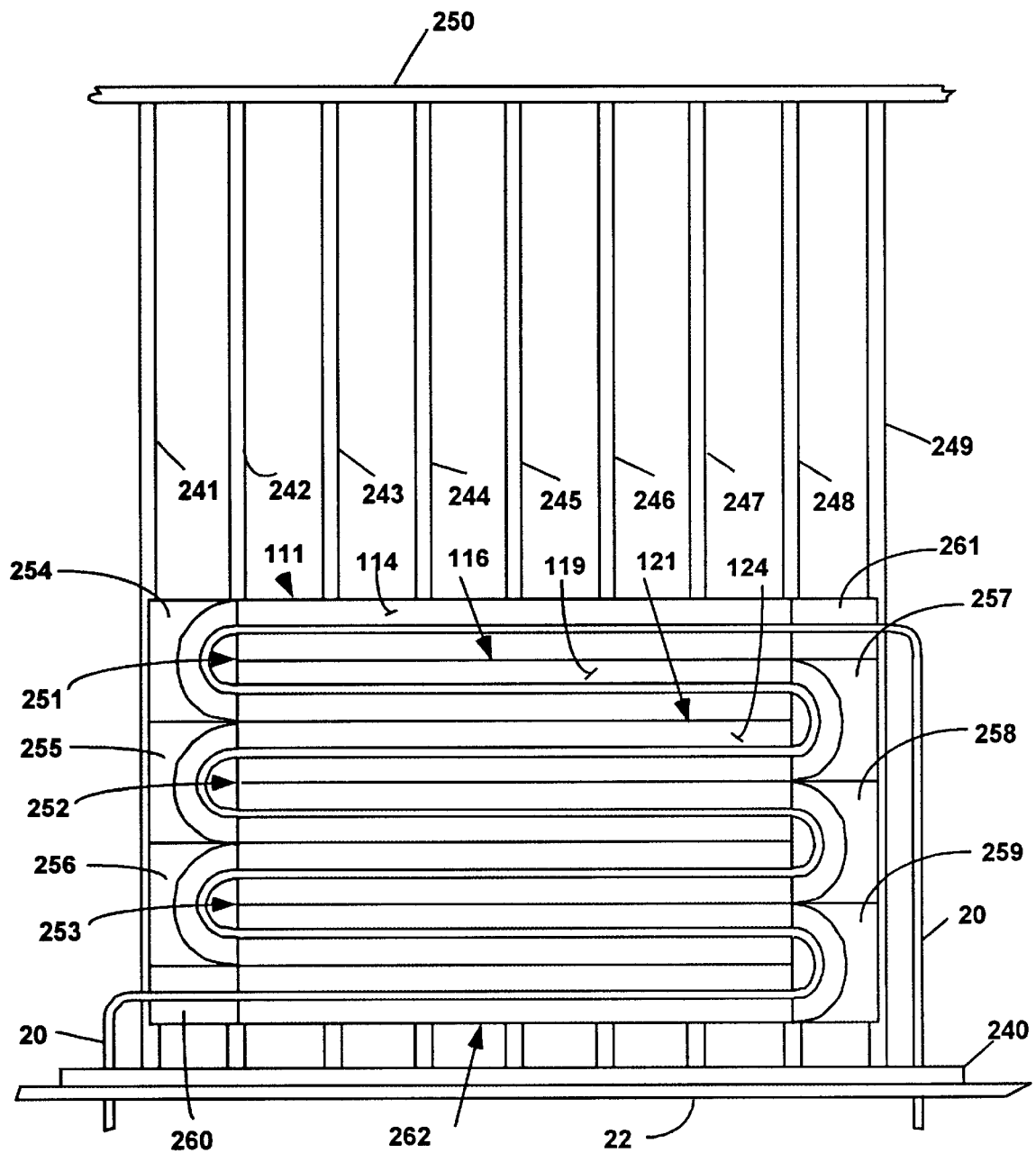
FIG. 24 is a front view of the RWH/RWC installation of hinged sets of panels of the Second Type, as in any of FIGS. 1 to 16, showing the wall sole plate, studs and top plate with several horizontal courses of side by side hinged sets of the panels and 180 degree turns (also of the Second Type) with the tubing 20 inserted and ready for installation of the finished wall covering.

A typical wood frame construction wall structure is shown in FIG. 24. It includes a wall sole plate 240, studs 241 to 249 and top plate 250 with six hinged sets of the straight run modular panels of the Second Type.

The installation of the unfolded side by side hinged sets of modular panels of the Second Type and additional kinds (U turn modular panels), also of the Second Type, and tubing 20 is all on top of the wall studs. It includes three courses of the straight run modular panels of the Second Type that are each side by side hinged sets of two, like the set of panels 111 and 116 shown in FIGS. 11 and 12, each course being two panels long. The three courses are denoted are 251, 252 and 253 and the six U turn modular panels 254 through 259 are arranged side by side and end to end across the floor, with straight panel sections 260 and 261 and 262 providing the tubing entry and exit to the courses, all together providing for seven passes of the tubing 20 inserted into the accommodating tube holding spaces of the panels and ready for covering by a finished floor covering.

The modular panels in this installation hold tubing 20 as a continuous length laid down serpentine fashion from panel to panel, embedded in the holding spaces of the straight and U turn modular panels and held securely therein by the space structure itself and the filler material therein. In this view of the floor installation, since panels of the Second Type are used throughout, the radiating plates are on top and show as they are denoted.

Ceiling Installation—Panels Of—Second Type— And Panels And Tubing Across Rafters, Etc.

Radiant hydronic cooling described herein is effective when installed in the ceiling, because the cooled air against the ceiling falls to the floor creating a convection flow that is favorable to providing even cooling throughout the room. In typical wood frame construction the ceiling of a room before the finished ceiling is installed is bare rafters, joists or strapping. Such a ceiling installation would be essentially the same as the wall installation shown in FIG. 24, except it would be on the rafters, joists, etc. of the ceiling instead of the wall studs as in FIG. 24.

Radiant hydronic cooling described herein is effective when installed in the ceiling, because the cooled air against the ceiling falls to the floor creating a convection flow that is favorable to providing even cooling throughout the room. In typical wood frame construction the ceiling of a room before the finished ceiling is installed is bare rafters, joists or strapping. Such a ceiling installation would be essentially the same as the wall installation shown in FIG. 18, except it would be on the rafters, joists, etc. of the ceiling instead of the wall studs as in FIG. 24.

Compliant Thermally Conductive Filler Material

A compliant filler material around the tubing held in the tubing holding space in any of the embodiments herein is applied to the space before the tubing is inserted or forced into the space. A purpose of the filler material is to hold the tubing in the space as an adhesive, while at the same time allowing the tubing to expand and contract longitudinally within the space of successive modular pieces that hold a length of tubing at installation. The tubing must be free to expand and contract, while the modular pieces are fixed by staples, nails, screws, etc. to the sub-floor, wall studs or ceiling rafters. Another purpose of the filler material is to reduce noise created by expansions and contractions of the tubing in the space. Yet another and important purpose is to provide a medium of thermal conduction from the tubing to the plate. A suitable filler material for any of these purposes is silicone rubber.

A convenient form of silicone rubber that can be used in the installations described herein is available commercially as a sealant or a caulking in viscous liquid form, usually dispensed from a tube by simply forcing it out of a nozzle on the tube. Such a sealant/caulking is usually a prepared mix of silicone dioxide, methanol and ammonia. A commercial source of this sealant/caulking mix is a General Electric product called SILICONE II that remains resilient for many years after it is applied.

CONCLUSIONS

While the inventions described herein are described in connection with several preferred embodiments, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

What is claimed is:

1. In a hydronic radiant heating and/or cooling system having a heating/cooling loop including a length of tubing that conducts water, mounted in a floor, wall or ceiling of a room heated/cooled by said system and modular panels each of a metal plate or sheet on a board or boards providing a tube holding space into which tubing is inserted and held against the plate in intimate thermal contact therewith, so that the plate is heated/cooled by conduction of heat between the water in the tubing and the plate, the improvement comprising, (a) two or more of said panels hinged together to provide a hinged set of panels, (b) said panels being hinged together along their sides, (c) whereby two or more of said sets of hinged panels unfolded at their hinges and arranged side by side on a floor, wall or ceiling provide elongated tube holding spaces into which said tubing is inserted and held against said radiation plate and a finished floor, wall or ceiling covering can be installed thereon and said system operated to heat or cool said room.

2. A hydronic radiant heating and/or cooling system as in claim 1, wherein,
   (a) said hinge is a strip of flexible material attached to the adjacent boards of the panels in the set.

3. A hydronic radiant heating and/or cooling system as in claim 1, wherein,
   (a) said hinge is a strip of flexible material attached to the plates of the panels in the set.

4. A hydronic radiant heating and/or cooling system as in claim 2, wherein,
   (a) said strip of flexible material is attached on top of the adjacent boards.

5. A hydronic radiant heating and/or cooling system as in claim 2, wherein,
   (a) said strip of flexible material is attached on the bottom of the adjacent boards.

6. A hydronic radiant heating and/or cooling system as in claim 3, wherein,
   (a) said strip of flexible material is attached to the plates on top of the panels in the set.

7. A hydronic radiant heating and/or cooling system as in claim 3, wherein,
   (a) said strip of flexible material is attached to the plates on the bottom of the panels in the set.

8. A hydronic radiant heating and/or cooling system as in claim 1, wherein,
   (a) said panels in the set are hinged together side by side.

9. A hydronic radiant heating and/or cooling system as in claim 1, wherein,
   (a) said panels in the set are hinged together end to end.

10. A hydronic radiant heating and/or cooling system as in claim 1, wherein,
    (a) there are two panels in the set and
    (b) said hinge is a strip of flexible material that covers the entire bottom of both panels of the set.

11. A hydronic radiant heating and/or cooling system as in claim 10, wherein,
    (a) said strip of flexible material also provides a layer of thermal insulation.

12. A hydronic radiant heating and/or cooling system as in claim 1, wherein,
    (a) said modular panel consists of two evenly spaced apart boards and a flat metal plat or sheet attached to the boards across the space providing said tube holding space defined by the space between the boards and the part of the plate across the spece.

13. A hydronic radiant heating and/or cooling system as in claim 12, wherein,
    (a) said hinge is a strip of flexible material attached to the adjacent boards of the panels in the set.

14. A hydronic radiant heating and/or cooling system as in claim 13, wherein,
    (a) said panels in the set are hinged together side by side.

15. A hydronic radiant heating and/or cooling system as in claim 13, wherein,
    (a) said panels in the set are hinged together end to end.

16. A hydronic radiant heating and/or cooling system as in claim 1, wherein,
    (a) said modular panel consists of two spaced apart boards and a metal plat or sheet that has a uniform longitudinal groove the length thereof attached to the boards with said groove projecting into the space between the boards.

17. A hydronic radiant heating and/or cooling system as in claim 16, wherein,
    (a) said hinge is a strip of flexible material attached to the adjacent boards of the panels in the set.

18. A hydronic radiant heating and/or cooling system as in claim 16, wherein,
    (a) said panels in the set are hinged together side by side.

19. A hydronic radiant heating and/or cooling system as in claim 16, wherein,
    (a) said panels in the set are hinged together end to end.

20. A hydronic radiant heating and/or cooling system as in claim 1, wherein,
    (a) said hinge has a pin that connects two parts attached to the panels in the set.

* * * * *